Jan. 22, 1963   G. L. ADAMS ET AL   3,074,703
LUMP PRODUCING HEAD FOR COAL AUGERING
Filed Feb. 24, 1960   3 Sheets-Sheet 1

INVENTORS
GEORGE L. ADAMS &
CHARLES T. GOVIN
BY
THEIR ATTORNEY

Jan. 22, 1963  G. L. ADAMS ET AL  3,074,703
LUMP PRODUCING HEAD FOR COAL AUGERING
Filed Feb. 24, 1960  3 Sheets-Sheet 2
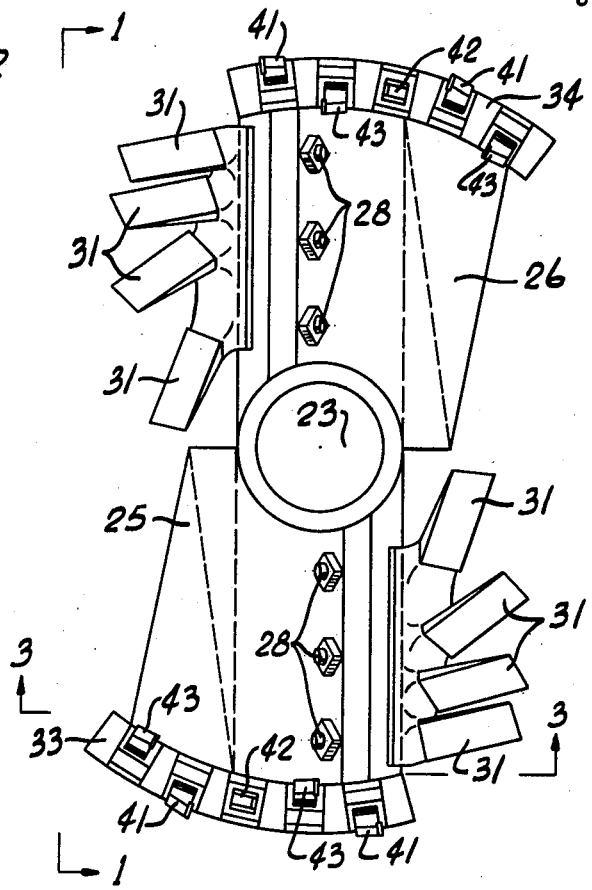
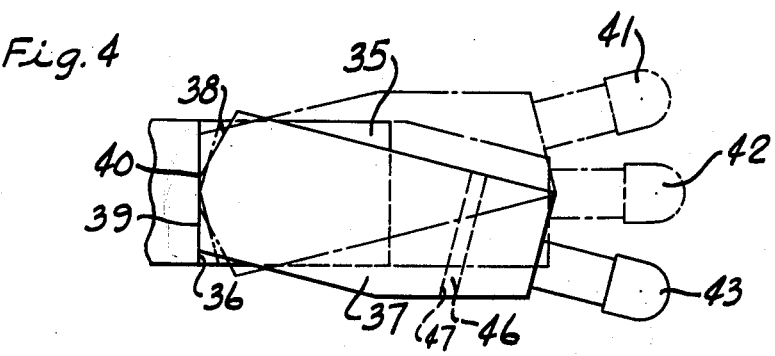
INVENTORS
GEORGE L. ADAMS &
CHARLES T. GOVIN
BY
THEIR ATTORNEY Jan. 22, 1963   G. L. ADAMS ET AL   3,074,703
LUMP PRODUCING HEAD FOR COAL AUGERING
Filed Feb. 24, 1960   3 Sheets-Sheet 3

INVENTORS
GEORGE L. ADAMS &
CHARLES T. GOVIN
BY
*William D. Carothers*

THEIR ATTORNEY

United States Patent Office 3,074,703
Patented Jan. 22, 1963

3,074,703
LUMP PRODUCING HEAD FOR COAL AUGERING
George L. Adams and Charles T. Govin, Salem, Ohio, assignors to The Salem Tool Company, Salem, Ohio, a corporation of Ohio
Filed Feb. 24, 1960, Ser. No. 10,773
1 Claim. (Cl. 262—26)

This invention relates generally to cutting heads for use on the ends of augers and more particularly to a cutting head for producing lump coal.

The principal object of this invention is the provision of a cutting head having an arcuate section spaced from the rotary axis for the purpose of carrying cutting teeth to cut a circular cut greater than the diameter of the trailing auger and leading the pilot bit and bits extending radially from the axis of rotation to the circular cut. By first making the circular cut in the coal and thereafter cutting a pilot bit hole materially behind the circular cut one can support the head within the coal to permit the bits that extend radially from the center of rotation to the outer annular cut to gauge out large chunks of coal that are picked up by the radial arms and forced backward to the auger in large chunks. In order to avoid the use of a completely annular cutter one may more successfully produce lump coal by using a stationary barrel immediately to the rear of the cutting head which barrel provides a rotary support for the cutting head at the end of the auger flight.

Another object is the provision of a lump producing head for coal augers having oppositely extending radial paddles from a central rotary axis which have mounted on their arcuate periphery a series of bits extending parallel with the axis and materially beyond the rotary central axis for cutting an annular kerf in the coal well in advance of a pilot bit set in the center of the cutting head and a series of cutting bits disposed along the radial paddles for gouging out the annular ring of coal between the central axis and the outer annular kerf with the gouging bits disposed behind the pilot bit. This provides three stages in cutting of the coal. The first stage being the annular kerf cut materially ahead of the pilot bit and the gouging bits being materially behind the hole made by the pilot bit. This enables the coal to be dug in large chunks leaving only the area of the outer central kerf and that taken from the pilot bit hole being the greater portion of coal making up the fines as originally recovered from the coal face. If the auger sections are not too long, large lump coal production may readily be obtained. However, the coal lumps in rolling out the hole due to the auger action may cause considerable fracture of the coal before it reaches the entrance of the augered hole. The fines of course aid in supporting the lump as it is being conveyed by the auger back through the hole which prevents the lumps from becoming too badly broken up. Of course the character of the coal plays an important part in the degree of the sizes of the lmps fractured from the face and also determines how readily the coal will be broken into smaller particles when conveying the lumps rearwardly by the auger sections.

A particular object in this invention is to provide arms with arcuate sections at their outer ends for producing deep kerfs in the coal face and materially ahead of the pilot bit which in turn is materially ahead of the gouging bits. This cutting head in having a complete annular support is best supported by a stationary nonrotating barrel in which is journaled the shaft driving the cutting head and supporting the forward end of the augers. With this combination, the whole of the cutting head in front of the nonrotary barrel functions to produce coal and provides no interference in traveling the coal from the coal face rearwardly and the paddles on the cutting head being inclined readily move the coal through the nonrotary barrel to within reach of the auger which withdraws the coal from the hole being augered. Since the cutting head has only what might be termed a two point suspension, the nonrotating barrel is provided with adjustable shoes to properly lock the cutting head and thereby correct for the drift action of the cutting head which permits the augering of straighter parallel holes in the coal that materially improves the production plane of removing the coal by augering.

Other objects and advantages appear hereinafter in the following description and claim.

The accompanying drawings show for the purpose of exemplification without limiting this invention or the claim thereto, certain practical embodiments illustrating the principles of this invention wherein:

FIG. 2 is an end view of the structure shown in FIG. 1.

FIG. 4 is a detailed view showing the bit and bit holders as employed in FIG. 1.

Figure 1:
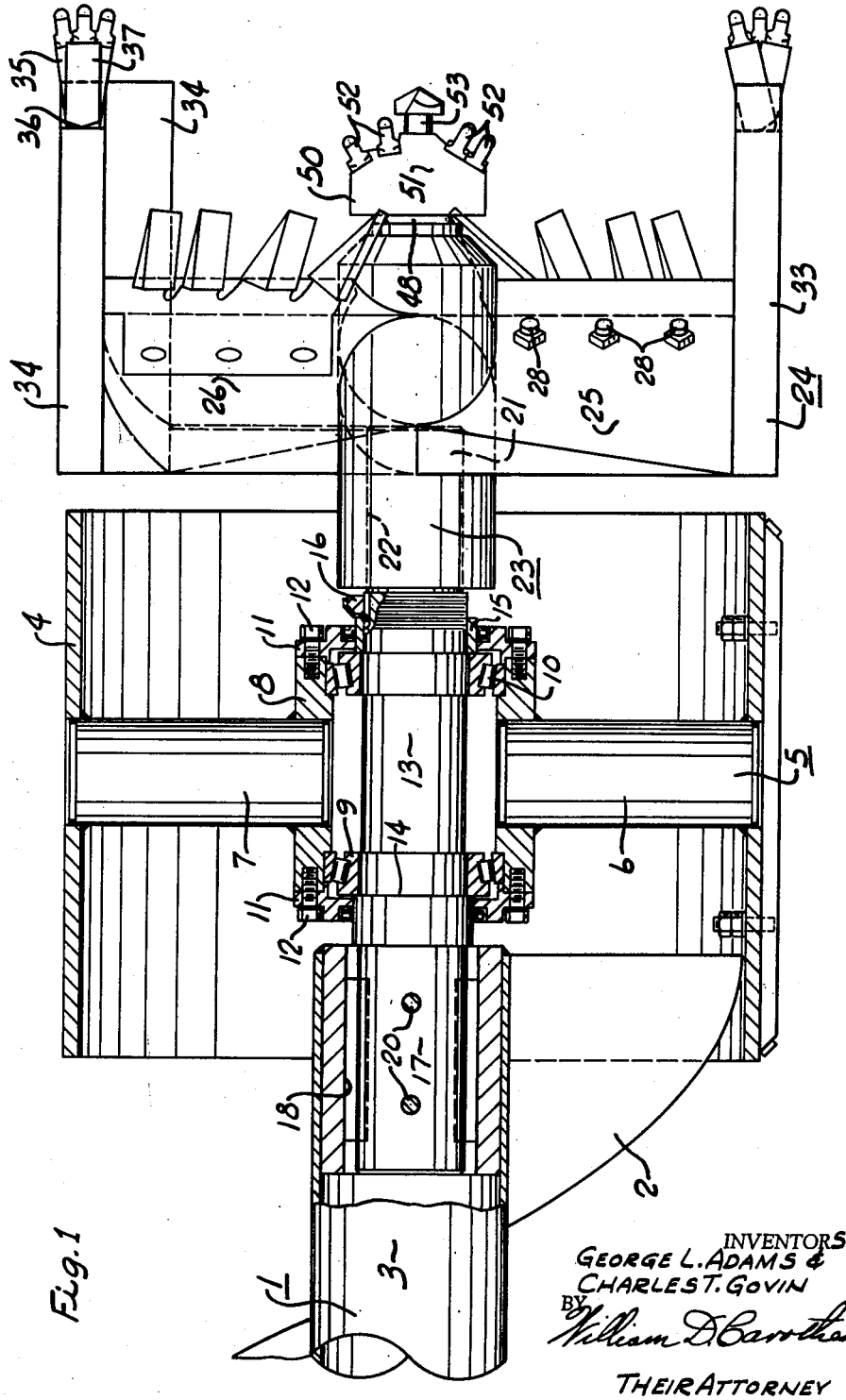
FIG. 1 is a view in side elevation with parts in section showing the lump producing head for coal augers, the lump producing head being taken along the line 1—1 of FIG. 2.

Referring to FIG. 1 of the drawings the auger section 1 is provided with an auger flight 2 welded to the shaft section 3 and the lead end of this auger flight 2 may extend into the barrel 4 of the nonrotary barrel member 5 which supports the two spoke members 6 and 7 that are diametrically opposed and carry the annular hub member 8 that receives the antifrictional bearings 9 and 10 at opposite ends which are encased by the cap members 11 held by the cap screws 12. A short shaft section 13 is rotably supported by the bearings 9 and 10, the shaft member 13 being provided with a shoulder 14 which engages the inner race of the bearing 9, the outer race being seated against the shoulder in the bore of the hub 8 and the bearing 10 having its outer race seated against a similar shoulder with its inner race held by the spaced 15 which is locked in place by the lock nut 16 threaded on the end of the shaft 13. The shaft 13 is provided with a nonround pin at each end.

The nonround pin 17 fits in the nonround socket 18 of the auger shaft 3 and is secured thereto by means of the transverse bolts 20.

The opposite end of the shaft 13 has a nonround pin member 21 that fits within the socket 22 of the hub member 23 of the cutting head 24. The hub member 23 of the cutting head 24 is provided with the radially extending flights or paddles 25 and 26 which extend diametrically opposite from one another and are sloped in the form of a flight as indicated in FIG. 3 so as to force the coal backward on either side of the spokes 6 and 7 of the nonrotary barrel member 4.

Figure 3:
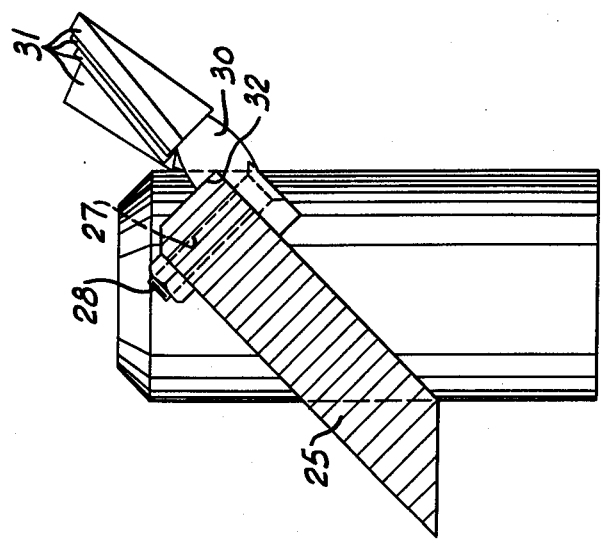
FIG. 3 is a sectional view of the lump producing head taken along the line 3—3 of FIG. 2.

As shown in FIGS. 1, 2 and 3 each of the paddle flight members 25 and 26 are provided with a series of holes 27 for receiving the bolts 28 which bolt the single bit member 30 that carries four bits 31 along the leading edge of the paddle flight members 25 and 26. The bit member 30 is provided with a shoulder 32 which fits the under corner edge of the paddle members 25 and 26 and thereby locks the bits relative to the paddle.

The outer end of each paddle flight 25 and 26 has secured thereto the arcuate kerf cutter 33 and 34. These arcuate cutters extend a little further than the width of the paddle flights 25 and 26 and are flush with the bottom of the paddles but extend materially thereabove. The top edge of each of these arcuate arms are castellated by the cutting therein of a series of transverse slots 35, the bottoms 36 of which function as a guide for the pre-positioning of the bit holders 37. Each bit holder 37 has two faces 38 and 39 formed on its bottom side which come together along the ridge or apex 40. If the face 38 is seated against the bottom 36 of the slot, the bit 41 will be positioned to the left as shown in FIG. 4. If the apex 40 is centered against the bottom surface 36, the bit in the socket of the bit holder will take the position as shown at 42 of FIG. 4. If however, the face 39 and the bottom of the bit holder is seated against the bottom 36 of the slot 35 the bit assumes the position as shown at 43 in FIG. 4. Thus the bits may be positioned alternately in each of the three positions as indicated in FIGS. 1 and 4 so as to cut clearance not only for the bit holders but for the arcuate kerf cutters 33 and 34.

The bit holders 30 together with the bit holders 37 may be made of a hard alloy steel so as to assume any wear when engaged and rubbed by the coal being freed from the coal face and the bit holder 30 thus protects the under face of the radial paddle flights 25 and 26 in initially engaging the moving the coal rearwardly to the stationary barrel 4.

As shown in FIG. 2, each of the arms 33 and 34 have five bits, two bits 41 and 43 are repeated and the single bit 42 is shown mounted in the center. This is found to be adequate to properly cut the depth kerf at the end of the arms 33 and 34.

Figure 5:
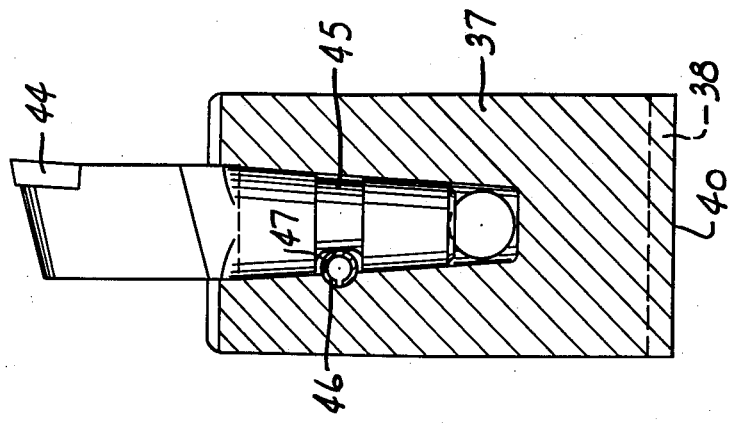
FIG. 5 is a sectional view showing the bit holder with the bit placed therein.

As shown in FIG. 5, the bit member is provided with a hardened alloy tip 44 and has an annular slot 45 in its tapered shank to receive the slotted heat treated tube 46 which is compressed when driven in the hole 47 so as to lock the bit tightly within the bit holder 37.

The outer end of the hub member 23 is bored with a nonround hole to receive a pin 48 on the pilot bit 50 which is in the form of a plate 51 having sockets to receive the bits 52 and a central bore to receive the stem of the centermost bit 53. The small bits 52 are similar to those shown in the bit holders 37 and are placed at different positions relative to the center of rotation. The central bit 52 is not much further beyond the rest of the pilot bit, however the end of the pilot bit cutting edges are materially behind the cutting edges of the bits in the arcuate kerf cutters 33 and 34. It will also be noted that the breaker bits 31 are likewise materially behind the location of the cutting edges of the pilot bit 50.

We claim:

A rotary cutting head consisting of a central hub arranged for mounting on a rotary axis and to carry a pilot bit, a pair of oppositely extending radial paddle flights secured to said hub, an arcuate kerf cutter having its inner arcuate face secured to the outer end of each paddle flight, the leading edge of each of said paddle flights being parallel with each other and tangent to a common circle on the rotary axis of said cutting head, bit means mounted to extend along the leading edge of each paddle flight and in advance thereof, bit means mounted to extend along the forward arcuate edge of each kerf cutter, said bit means on the leading edge of said paddle flights being located in advance of its respective kerf cutter in the direction of rotation, and said bit means on the forward arcuate edge of each kerf cutter being located axially in advance of the bit means on the leading edge of said paddle flights.

References Cited in the file of this patent

UNITED STATES PATENTS

| | | |
|---|---|---|
| 1,789,399 | Bartenbach et al. | Jan. 20, 1931 |
| 2,749,102 | Goodrich | June 5, 1956 |
| 2,749,104 | Barrett | June 5, 1956 |
| 2,770,449 | McCarthy | Nov. 13, 1956 |
| 2,776,123 | Snyder | Jan. 1, 1957 |
| 2,838,295 | Compton | June 10, 1958 |

FOREIGN PATENTS

| | | |
|---|---|---|
| 737,707 | Great Britain | Sept. 28, 1955 |